(12) United States Patent
Van Weelden

(10) Patent No.: US 8,534,639 B1
(45) Date of Patent: Sep. 17, 2013

(54) SOLENOID VALVE WITH A DIGRESSIVELY DAMPED ARMATURE

(75) Inventor: Curtis L. Van Weelden, Waukesha, WI (US)

(73) Assignee: HUSCO Automotive Holdings, Inc., Waukesha, WI (US)

( * ) Notice: Subject to any disclaimer, the term of this patent is extended or adjusted under 35 U.S.C. 154(b) by 30 days.

(21) Appl. No.: 13/449,989

(22) Filed: Apr. 18, 2012

(51) Int. Cl.
*F16K 31/12* (2006.01)

(52) U.S. Cl.
USPC ............... 251/51; 251/50; 251/48; 251/12

(58) Field of Classification Search
USPC ............. 251/12, 48, 50, 51, 53, 55, 120, 127; 137/625.2, 625.25, 625.67
See application file for complete search history.

(56) References Cited

U.S. PATENT DOCUMENTS

| | | | | |
|---|---|---|---|---|
| 2,407,957 A * | 9/1946 | Hull-Ryde | ...................... | 60/575 |
| 2,471,605 A * | 5/1949 | Broeze | .......................... | 137/509 |
| 2,827,923 A * | 3/1958 | Sadler | ........................... | 137/589 |
| 2,968,464 A * | 1/1961 | Olson | ........................ | 251/30.04 |
| 3,316,031 A * | 4/1967 | Henry-Biabaud | ............. | 303/50 |
| 3,326,511 A * | 6/1967 | Knud Hallgreen | ............. | 251/54 |
| 4,638,974 A * | 1/1987 | Zeuner et al. | ............ | 251/129.15 |
| 4,795,129 A * | 1/1989 | Clark | ............................. | 251/62 |
| 5,205,249 A | 4/1993 | Markley et al. | | |
| 5,218,935 A | 6/1993 | Quinn, Jr. et al. | | |
| 5,649,748 A * | 7/1997 | Oehler et al. | ............. | 303/119.2 |
| 5,778,932 A * | 7/1998 | Alexander | .............. | 137/625.65 |
| 6,073,649 A * | 6/2000 | Somorov | ................. | 137/505.41 |
| 6,179,268 B1 | 1/2001 | Seid | | |
| 6,578,606 B2 * | 6/2003 | Neuhaus et al. | ......... | 137/625.65 |
| 6,811,135 B2 | 11/2004 | Moreno et al. | | |
| 7,669,832 B2 * | 3/2010 | Petersen | .................. | 251/129.15 |
| 8,104,511 B2 * | 1/2012 | Reilly | ...................... | 137/625.65 |
| 8,397,759 B2 * | 3/2013 | Oikawa et al. | ........... | 137/625.68 |
| 8,434,516 B2 * | 5/2013 | Aranovich | .............. | 137/625.67 |
| 2002/0074532 A1 * | 6/2002 | Rovira et al. | ............ | 251/129.21 |
| 2003/0146400 A1 * | 8/2003 | Mueller | .......................... | 251/48 |
| 2006/0225976 A1 * | 10/2006 | Nakadate | ...................... | 188/266 |

FOREIGN PATENT DOCUMENTS

WO 2008039500 A1 4/2008

* cited by examiner

*Primary Examiner* — John K Fristoe, Jr.
*Assistant Examiner* — Umashankar Venkatesan
(74) *Attorney, Agent, or Firm* — Quarles & Brady LLP; George E. Haas

(57) ABSTRACT

An electrohydraulic control valve includes a solenoid actuator that slides a valve element within a valve body to control fluid flow between a workport and each of a supply port and an exhaust port. The solenoid actuator has an armature that incorporates an element which digressively damps bidirectional motion of the armature. The element preferably damps the motion of the valve element according digressive damping velocity-force relationship.

21 Claims, 3 Drawing Sheets

SOLENOID VALVE WITH A DIGRESSIVELY DAMPED ARMATURE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to solenoid operated hydraulic valves and in particular to techniques for damping the operation of such valves.

2. Description of the Related Art

Solenoid operated valves have been developed for a variety of equipment to selectively apply and exhaust pressurized fluid to and from a component, the operation of which is controlled by that valve. One type of such valve has a spool that slides within a bore. In one position, the spool provides a path between a supply conduit containing pressurized fluid to a workport that is connected to the component being operated by the valve. In another position, the spool provides a path between the workport and an exhaust port to relieve pressure at the workport. In a third position of the spool, the workport is disconnected from both the supply and the exhaust ports.

In many applications relatively high pressure acts on the spool and other components of the valve which can produce large forces that adversely affect the operation of the valve and the longevity of those components. As a consequence, these valves often include a damping mechanism to restrict the rate at which the spool and solenoid components operate, thereby reducing the adverse affects that high pressure forces have on the valve components. Such damping devices also provide stability to the valve operation under a range of pressure levels.

In a typical valve, the armature moves within a central bore of the solenoid. In order for that motion to occur, fluid in a chamber on one side of the armature must flow to a chamber on the opposite side of the armature in order to provide space for the armature motion. In the most simplistic form of damping, a fixed orifice is provided between the chambers, thereby restricting the rate of flow and thus the velocity of the armature. However, satisfactory damping control with a fixed orifice is often difficult to achieve for systems, such as in outdoor equipment, in which the viscosity of the fluid varies with respect to temperature. In other words, the fluid at relatively high temperatures has a low viscosity and thus can flow more freely through the fixed orifice, as compared to when the fluid has a lower temperature and a higher viscosity.

Therefore, it is desirable to provide a damping mechanism that yields a more uniform damping over a wide range of operating temperatures and fluid viscosities.

SUMMARY OF THE INVENTION

An electrohydraulic control valve has a valve body with a fluid passage therein and a first port, a second port, and a workport open into the fluid passage. A valve element is moveably received within the fluid passage for selectively controlling the flow of fluid between the workport and each of the first and second ports. A solenoid actuator includes a moveable armature that is operatively coupled to move the valve element. A first chamber is defined on one side of the armature and a second chamber is defined on another side of the armature. The armature has an armature bore extending between the first chamber and the second chamber.

A digressive damping element is operatively coupled to control bidirectional fluid flow through the armature bore. The digressive damping element opens and closes the armature bore to fluid flow in response to a difference in pressure between the first chamber and the second chamber. The digressive damping element maintains the armature bore closed as the difference in pressure increases from zero, and opens the armature bore when the difference in pressure exceeds a given level.

In one aspect of the present invention, the digressive damping element comprises a body with passages in an exterior surface and a spring that bidirectionally biases the body into a closed state.

In another aspect of the present invention, the digressive damping element comprises a disk secured in the armature bore, wherein the disk has a flap that bends in response to the difference in pressure.

DETAILED DESCRIPTION OF THE INVENTION

Figure 1:
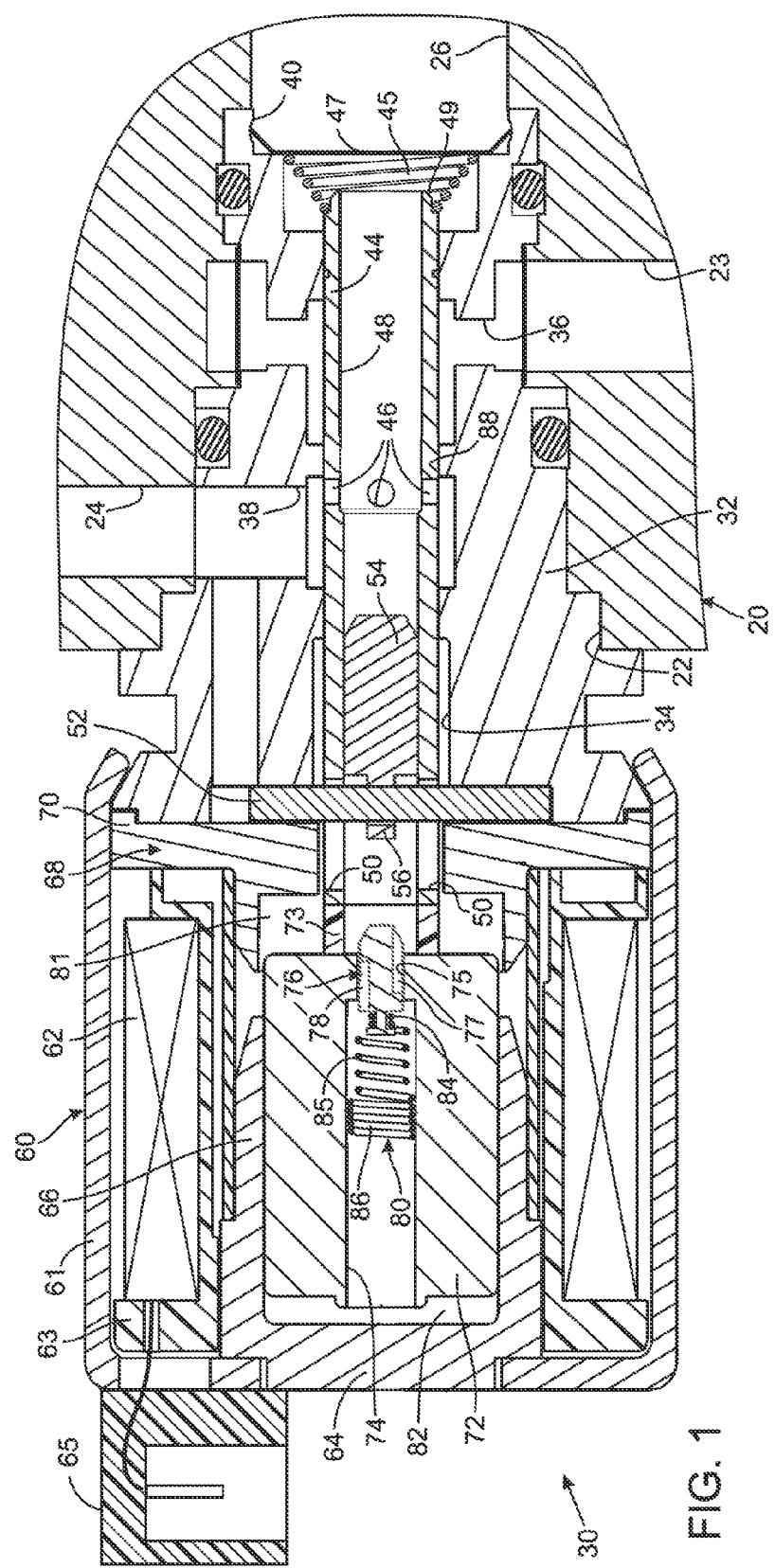
FIG. 1 is a cross sectional view through a first electrohydraulic control valve according to the present invention in which a workport is normally connected to an exhaust port in a deactivated state of the valve.

References herein to directional movement, such as left or right, refer to the motion of the components in the orientation illustrated in the drawings, which may not be the orientation of the components or the present control valve when attached to a machine With initial reference to FIG. 1, an electrohydraulic first control valve 30 is illustrated inserted into an aperture 22 in a manifold 20. The manifold 20 has a supply passage 23 that conveys pressurized fluid from a source such as a pump (not shown) and a return passage 24 that conveys fluid back to a tank (not shown). The manifold 20 also has a device passage 26 to which is connected a hydraulic component that is controlled by the first control valve 30.

The first control valve 30 has a tubular valve body 32 with a longitudinal bore 34 and transverse openings which provide ports between the manifold passages and the longitudinal bore. Specifically, the longitudinal bore 34 is connected by a supply port 36 to the supply passage 23 and by an exhaust port 38 to the return passage 24. A workport 40 at the nose of the tubular valve body 32 opens into the manifold device passage 26.

A spool-like, tubular valve element 44 is slideably received within the bore 34 of the valve body 32 and is moved therein by a solenoid actuator 60. A central bore 48 extends between the opposite ends of the valve element. A plurality of radial apertures 46 communicate with the valve element bore 48 which forms a fluid passage, so that in selective positions of the valve element fluid paths are provided between the workport 40 and either the supply port 36 or the exhaust port 38. In this type of proportional control valve, the flow to and from the workport goes through the center of the valve element. The first control valve 30, is referred to as having a "normally low pressure state" because in the deactivated state the workport 40 is connected to the exhaust port 38.

The workport pressure acts on the adjacent end surface of the valve element and for previous valve elements this was the entire circular end surface area. This also applies when the valve element bore is a blind aperture opening only at the end of the valve element facing the workport. In this case, the pressure also acts on the interior end surface of that bore. Even in designs in which that bore extends completely through the valve element, the workport pressure reaching the opposite end often acts on the solenoid actuator that operates the valve, thereby having the same effect on valve operation as with a blind valve element bore. In all these designs, the solenoid actuator has to overcome the feedback force that results from the workport pressure acting on that valve element surface area.

A drawback of these designs is that in order to control a greater amount of fluid flow, a larger valve element is required which results in a larger feedback force from the workport pressure acting on the valve element. The larger feedback force in turn requires greater counter force from the solenoid to move the valve element, thus requiring a larger solenoid. The present valve element arrangement eliminates the need for a significantly larger solenoid in order to design a valve with a larger flow capability. This is accomplished by designing a tubular valve element 44 wherein the force from the workport pressure acts only on an annular end surface 49 of the valve element. By judiciously designing the inner and outer diameters of the valve element 44, the area of that annular end surface 49 does not increase significantly as the size of the valve element is increased to handle greater flow. Thus the surface area on which the workport pressure acts remains relatively unchanged. Therefore, the size of the solenoid actuator can remain the same or at least does not have to increase as significantly to operate a larger flow capacity valve element.

This is accomplished by placing a slug 54 of solid material within the valve element 44 and transferring the pressure force acting on the slug to a stationary part of the valve structure and not to the valve element. In particular, the slug 54 is located within the valve element bore 48 and has an outer diameter slightly less than the diameter of that valve element bore, so as to allow the valve element 44 to slide over the slug. A tab 56 extends from one end of the slug 54 and has an aperture there through. A cross pin 52 extends through that aperture and through elongated slots 50 near the end of the valve element 44 that is remote from the workport 40. The length of the slots 50 allows the valve element 44 to slide unobstructed within the valve body bore 34, as will be described. End sections of the cross pin 52 are held between the valve body 32 and the solenoid actuator 60 which thereby holds the slug 54 in a fixed position relative to the valve body. In other words, as the valve element 44 slides within the valve body bore 34, the slug 54 remains stationary. With this arrangement, the force exerted on the slug 54 of solid material, due to the workport pressure in the valve body bore 34, is transferred directly to the stationary part of the valve structure, i.e. the valve body 32 and the solenoid actuator 60, and is not applied to the valve element 44. As a consequence that force does not affect the motion of the valve element.

The slug 54 reduces the surface area on which pressure acts on the valve element 44 to the area between the outer diameter of the valve element and the outer diameter of the slug. This results in an annular surface area at the end 49 of the valve element 44 that faces the workport. Thus the surface area on which the pressure at the workport 40 acts on the valve element 44 has been reduced from the entire circular cross sectional surface area to just this annular surface area. The force exerted on the valve element 44 due to the pressure is directly related to the surface area on which the pressure acts and that force must be overcome by the solenoid actuator 60 to move the valve element. Heretofore with previous valve element arrangements, in which the pressure acted on the entire cross sectional surface area of the valve element, as the size of the valve element was increased in order to control a larger fluid flow, the force due to the pressure increased proportionally. Thus a larger solenoid actuator was required to overcome that greater force and move the valve element. With the present valve element arrangement, as the size of the valve element 44 is increased for a higher flow capacity valve, so too is the size of the slug 54 increased. Therefore, the size of the annular end surface 49 of the valve element 44 does not increase as significantly, and may remain relatively the same by increasing the size of the slug 54 disproportionally to the valve element size increase. As a result, the present valve element arrangement enables the valve element size to be increased without any or at least without a significant increase in the size of the solenoid actuator 60.

The solenoid actuator 60 includes a can-like metal case 61 that contains an electromagnetic coil 62 which is wound on a non-magnetic bobbin 63, preferably formed of a plastic. A magnetically conductive first pole piece 64 has a cylindrical, tubular section 66 which extends into one end of the bobbin 63. A magnetically conductive, second pole piece 68 extends into the opposite end of the bobbin 63 and has an interior end that is spaced from the first pole piece 64. The second pole piece 68 has an outwardly projecting flange 70 that extends across the open end of the metal case 61 which is crimped around part of the valve body 32. The metal case 61 and the second pole piece 68 form a housing of the solenoid actuator 60. The engagement of the metal case 61 with the first and second pole pieces 64 and 68 provides a highly conductive magnetic flux path within the electromagnetic coil 62.

An armature 72 within the solenoid actuator 60 is slideably received within the first and second pole pieces 64 and 68. One end of the armature 72 defines a first chamber 81 within the second pole piece 68 and the opposite end of the armature defines a second chamber 82 within the first pole piece 64. These chambers fill with the fluid that flows through the control valve. The armature 72 slides within the first and second pole pieces 64 and 68 in response to a magnetic field that is produced by applying electric current to the electromagnetic coil 62 via a connector 65. For example, the electromagnetic coil 62 may be driven by a pulse width modulated (PWM) signal having a duty cycle that is varied in order to position the valve element 44 within the pole pieces. The armature 72 engages a driver tube 73 that is formed of a non-magnetic material and that abuts the interior end of the valve element 44. Therefore, application of the electric current to the electromagnetic coil 62 moves the armature 72 to the right in FIG. 1, thereby pushing the valve element 44 to the right.

The armature 72 has a bore 74 extending between opposite ends, thereby forming a fluid passageway between the first and second chambers 81 and 82. The armature bore 74 has a section adjacent the end that faces the valve element 44 which has a reduced diameter thereby forming an armature aperture 75. A digressive damping element 76 is located within that armature aperture 75 and is able to slide longitudinally therein. A spring 80 is within the armature bore 74 and has a first end affixed to the damping element 76. For example, at one end of the spring 80 is a first section 84 of coil turns with a smaller diameter than a second section 85 of coil turns in the center of the spring. The coil turns in the first section 84 are wrapped around a tab with a head that projects from the main body of the digressive damping element 76. A third section 86 of coil turns at an opposite end of the spring 80 has larger diameter than the center second section 85. The coil turns of the third section 86 are press fitted into the armature bore 74 and thereby are held stationary in the bore at that position. When equal fluid pressure levels act on both sides of the damping element 76, the spring 80 centers the damping element within the armature aperture 75. The spring 80 exerts both tension and compression forces, which allow the damping element 76 to move bidirectionally in response to a pressure differential across the damping element.

A first flute 77 extends partway along the exterior surface of the digressive damping element 76 from the end facing the valve element 44. When the damping element 76 is centered longitudinally within the armature aperture 75, the first flute 77 only communicates with the first chamber 81 and does not open into the armature bore 74. A second flute 78 extends partway along the exterior surface of the damping element 76 from the end that is in the armature bore 74. When the damping element 76 is centered longitudinally within the armature aperture 75, the second flute 78 only communicates with the armature bore 74 and does not open into the first chamber 81. Thus when centered in the armature aperture, the damping element 76 does not provide a significant fluid path between the two armature chambers 81 and 82. Alternatively the flutes may be replaced by flat regions on the exterior surface of the damping element. With either version, the flutes or flats form passageways in the exterior surface of the damping element 76.

A conical coil spring 45 is located adjacent the workport 40. A small diameter end of the conical coil spring 45 engages the end of the valve element 44 and the larger end of the spring is held within the bore 34 of the valve body 32 by a retaining ring 47. The conical coil spring 45 biases the valve element into the illustrated normal position when current is not being applied to the solenoid actuator 60. In that illustrated position, the apertures 46 in the valve element open into the exhaust port 38, thereby providing a path between the exhaust port and the workport 40 when the valve is in the de-energized state.

When electric current is applied to the electromagnetic coil 62, a magnetic field is produced within the solenoid actuator 60 that causes the armature 72 to move to the right in the drawing, thereby pushing the valve element 44 to the right as well. By applying a first level of electric current to the electromagnetic coil 62, the armature 72 is moved so that the valve element apertures 46 align with a land 88 in the valve body bore 34 between the supply port 36 and the exhaust port 38. In this position, the valve element apertures 46 are closed so that the bore 48 of the valve element 44 is not in communication with either the supply or the exhaust port 36 or 38. As a consequence, the workport 40 is closed off from the other two ports. Increasing the magnitude of electric current applied to the electromagnetic coil 62 moves the armature 72 and the valve element 44 farther to the right in FIG. 1 aligning the apertures 46 with the supply port 36. This enables fluid from the supply port to flow through the apertures 46 and the valve element bore 48 toward the workport 40. Thereafter, when the application of electric current to the electromagnetic coil 62 is terminated, a magnetic field no longer acts on the armature 72. At that time, the conical coil spring 45 pushes the valve element 44 and thus the armature 72 leftward in FIG. 1 and into the illustrated normal position where the valve element apertures 46 communicate with the exhaust port 38.

When the armature 72 moves within the pole pieces 64 and 68, the volume of one of the chambers 81 or 82 is expanding while the volume of the other chamber is correspondingly decreasing. For that motion to continue, fluid within the chamber that is decreasing in volume must flow into the expanding chamber. For example, if the armature is moving to the right in FIG. 1, that motion will increase the pressure of the fluid within the first chamber 81 and decrease the pressure in the second chamber 82, producing a difference in pressure that acts on the damping element 76. As the armature initially moves, the fluid in the first chamber 81 can only flow into the second chamber 82 around the closed damping element 76 and between the armature 72 and the two pole pieces 64 and 68. These are small paths thereby causing the pressure in the first chamber 81 to increase rapidly as the velocity of the armature 72 increases. This pressure increase exerts a relatively rapidly increasing the motion damping force on the armature 72 as depicted by the graph in FIG. 2.

If the magnitude of electric current applied to the solenoid actuator 60 causes the armature 72 to move at a sufficiently high velocity, then a significantly higher pressure will be produced in the first chamber 81 than in the second chamber 82. This difference in pressure causes the damping element 76 to be pushed far enough into the bore aperture 75 that the first flute 77 opens into the armature bore 74. That event occurs at point 89 on the damping curve in FIG. 2. This exposure of the first flute 77 provides a sizeable path for additional fluid to flow past the damping element 76 from the first chamber 81 into the second chamber 82. Thereafter as the velocity of the armature continues to increase, the damping force exerted thereon by the pressure within the first chamber 81 increases very gradually. This results in the first control valve 30 having relatively high damping rates at low armature velocities and significantly lower damping rates at higher armature velocities, which is referred to as "digressive damping." As used herein a "digressive damping element" is a component of a valve that damps the motion of the valve element according to that velocity-force relationship.

Figure 2:
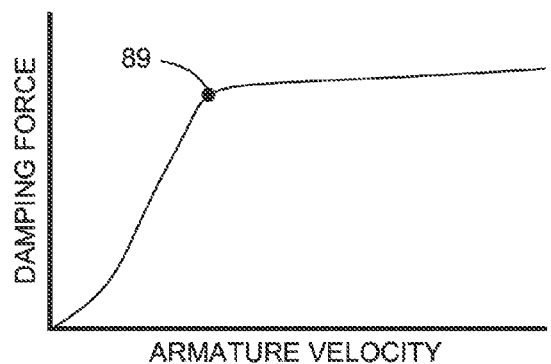
FIG. 2 is a graph depicting the relationship between the velocity at which the armature and valve element move and damping force provided by a damping element in the control valve.

A similar digressive damping operation occurs when the electric current is removed from the electromagnetic coil 62 and the valve element 44 and armature 72 move to the left due to the force of the conical coil spring 45 and the workport pressure. At that time, fluid is forced out of the second chamber 82 into the first chamber 81. If the armature moves rapidly enough, the pressure in the second chamber 82 reaches a point at which the damping element 76 moves sufficiently far to the right where the second flute 78 opens a path from the armature bore 74 into the first chamber 81. This operation produces a similar damping curve as illustrated in FIG. 2. Therefore the first control valve 30 exhibits digressive damping in both directions of operation.

Figure 3:
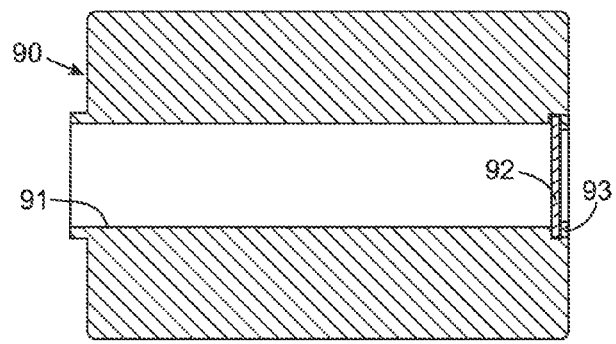
FIG. 3 is a cross sectional view through a valve element which incorporates an alternative damping element to the one shown in FIG. 1.

FIG. 3 illustrates a second type of an armature 90 which has an alternative digressive damping element 92. This armature 90 has a longitudinal bore 91 extending between both ends of the armature. One end of the longitudinal bore 91 has an enlarged opening in which a flat, disk-shaped damping element 92 is held by a snap-type retaining ring 93. With additional reference to FIG. 4, the disk-shaped damping element 92 has a U-shaped slot 94 extending there through and centrally located therein. The slot 94 forms a flap 96. When the armature 90 moves within the solenoid actuator 60, the pressure differential between the chambers 81 or 82 on opposite sides of the armature causes the flap 96 to bend away from the plane of the disk. This produces an opening through that disk. That opening increases the size of the passage through which fluid flows between the two chambers 81 and 82. The flap 96 is able to bend in either direction from the plane of the disk to accommodate the bidirectional motion of the armature 90. This disk-shaped digressive damping element 92 functions in a similar manner to the cylindrical damping element 76 and its spring 80 shown in FIG. 1.

Figure 5:
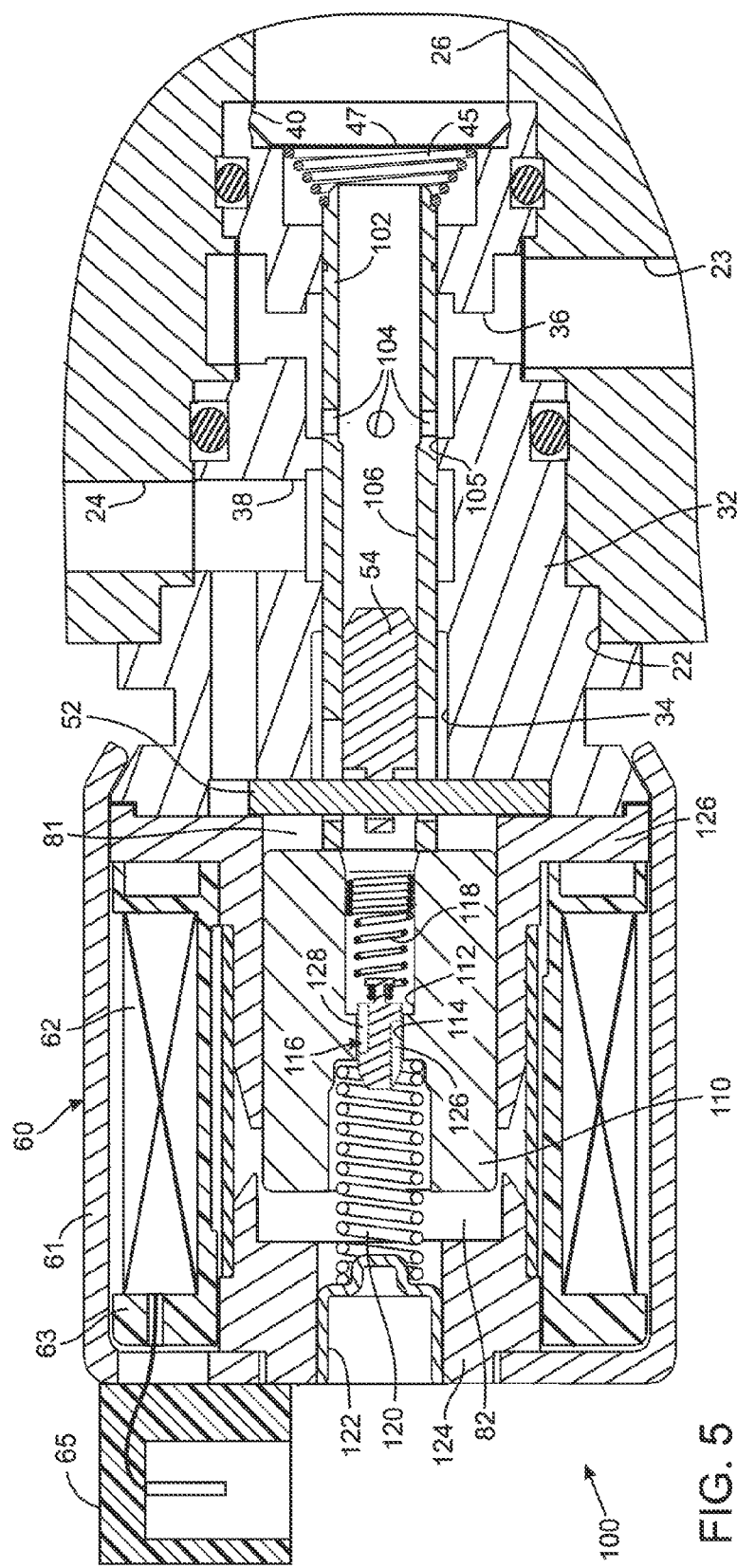
FIG. 5 is a cross sectional view through a second electrohydraulic control valve that normally connects the workport to a pressurized fluid supply port.

FIG. 5 illustrates a second control valve 100 in which components that are the same as those in the first control valve 30 have been assigned identical reference numerals. To simplify the description herein, those components will not be described in detail again. The second control valve 100 has a normally high pressure state, meaning that when electric current is not being applied to the electromagnetic coil 62, the valve element 102 is biased into a position in which a path is formed between the pressurized fluid supply port 36 and the workport 40. As a consequence, the valve element 102 is slightly different so that the apertures 104 that extend outward from the central bore 106 are located to communicate with the supply port 36 in that de-energized state. The valve element 102 directly abuts the armature 110.

The armature 110 also is slightly different in that the armature aperture 114 is located in the midsection of the armature bore 112. The cylindrical digressive damping element 116, located in the armature aperture 114, is biased by a damping spring 118 connected to the side of the damping element that faces the valve element 102. The damping spring 118 is identical to the previously described damping spring 80 for the first control valve 30 and is secured to the damping element and in the armature bore 112 in the same ways.

An armature spring 120 biases the armature 110 away from the exterior end of the solenoid actuator 60 so as to push the armature and the valve element 102 into the normally high pressure state of the valve that is illustrated. A spring adjustment cup 122 is press fitted into an aperture in the first pole piece 124 by an amount that sets the force which the armature spring 120 exerts on the armature 110. A second pole piece 126 provides an interior cylindrical surface against which the armature 110 slides.

When electric current is applied to the electromagnetic coil 62 of the second control valve 100, a magnetic field is produced within the solenoid actuator 60 that pulls the armature 110 father into the electromagnetic coil, i.e., to the left in the orientation of the drawing. This action compresses the armature spring 120. The bias force applied to the valve element 102 by the conical coil spring 45 pushes the valve element against the end of the armature 110 thereby causing the valve element to follow the motion of the armature. Therefore, the valve element 102 initially moves into a position in which the transverse apertures 104 are covered by a land 105 within the valve body bore 34. In this position, the fluid communication which previously existed between the supply port 36 and the workport 40 is terminated. Thus, fluid is not allowed to flow between those ports. It should be understood that by applying the proper level of electric current to the electromagnetic coil 62, the valve element 102 may be maintained in this closed position. Application of a greater level of electric current to the electromagnetic coil 62 enables the armature 110 and the valve element 102 to move farther leftward into a position at which the apertures 104 in the valve element open into the exhaust port 38. Fluid communication now is established between the workport 40 and the exhaust port 38 through the valve element bore 106 and the apertures 104.

As the armature 110 of the second control valve 100 moves, fluid is forced to flow between the first and second solenoid chambers 81 and 82. The direction of that flow depends upon the direction in which the armature 110 is moving. For example, when the armature 110 moves to the left in FIG. 5, fluid is forced from the second chamber 82 into the first chamber 81. Initially the fluid flows only around the outside of the armature 110 and through its bore 112 past the closed digressive damping element 116. As the pressure within the second solenoid chamber 82 increases due to greater velocity of the armature 110, the force exerted on the end of the damping element 116 that faces the second chamber 82 increases. Eventually the force pushes the damping element 116 into a position in which the first flute 126 provides a path between both sides of the armature aperture 114. This increases the amount of fluid flow from the second chamber 82 into the first chamber 81. This operation provides digressive damping of the motion of the armature 110 and the valve element 102, as depicted in FIG. 2.

Thereafter, when the electric current is removed from being applied to the electromagnetic coil 62, the force of the armature spring 120 returns the armature 110 and the abutting valve element 102 to the normal position illustrated in FIG. 3. The pressure differentials produced in chamber 81 and 82 by the armature motion are similar to but reversed from those produced when the electromagnetic coil was energized. In response, the digressive damping element 116 operates in a reverse manner, damping the fluid flow from the first chamber 81 into the second chamber 82. Therefore the damping element 116 provides digressive damping of the bidirectional movement of the armature 110 and valve element 102 in the second control valve 100.

Figure 4:
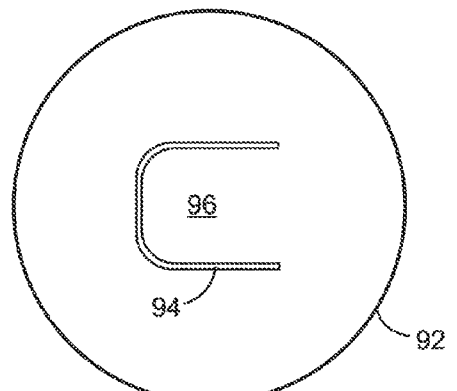
FIG. 4 is a plane view of the alternative damping device.

It should also be appreciated that the disk-type digressive damping element 92 shown in FIG. 4 could be substituted for the cylindrical damping element 116 in the second control valve 100.

The foregoing description was primarily directed to one or more embodiments of the invention. Although some attention has been given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. An electrohydraulic control valve comprising:
   a valve body having fluid passage therein with a first port and a second port opening into the fluid passage;
   a valve element moveably received within the fluid passage for selectively controlling flow of fluid between the first port and the second port;
   a solenoid actuator having a moveable armature operatively coupled to move the valve element and defining a first chamber on one side of the armature and a second chamber on another side of the armature; and
   a damping element operatively coupled to control fluid flow through a passage between the first chamber and the second chamber, wherein the damping element varies flow through the passage in response to a difference in pressure between the first chamber and the second chamber, to digressively dampen the motion of the armature.

2. The electrohydraulic valve as recited in claim 1 wherein the damping element maintains the passage closed as the difference in pressure increases when the armature begins to move, and opens the passage in response to the difference in pressure exceeding a given level.

3. The electrohydraulic valve as recited in claim 1 wherein the passage is formed by an armature bore extending through the armature between the first chamber and the second chamber.

4. The electrohydraulic valve as recited in claim 1 wherein the damping element comprises a body with at least one passageway formed therein.

5. The electrohydraulic valve as recited in claim 1 wherein the damping element comprises a body with passageways in an exterior surface.

6. The electrohydraulic valve as recited in claim 1 wherein the damping element has a first end facing the first chamber and a first passageway extending inwardly from the first end; and has a second end facing the second chamber and a second passageway extending inwardly from the second end.

7. The electrohydraulic valve as recited in claim 1 wherein the damping element comprises a body and a spring having one end fixedly attached to the body and another end secured to a surface of the passage.

8. The electrohydraulic valve as recited in claim 7 wherein the spring comprises a first section affixed to the body and having a first diameter, second section contiguous with the first section and having a second diameter that is larger than the first diameter, and a third section contiguous with the second section and having a third diameter that is larger than the second diameter, wherein the third section abuts a surface of the passage.

9. The electrohydraulic valve as recited in claim 1 wherein the damping element comprises a disk secured across the passage and wherein the disk has a flap that bends in response to the difference in pressure.

10. The electrohydraulic valve as recited in claim 1 further comprising an armature spring which biases the armature toward the valve element.

11. The electrohydraulic valve as recited in claim 1 wherein a valve body further comprises a third port opening into the fluid passage; and the valve element selectively controls flow of fluid between the first port and each of the second and third ports.

12. The electrohydraulic valve as recited in claim 1 wherein the valve element comprises first and second ends with an exterior surface there between, and further comprises a valve element bore extending inwardly from the first end, and an aperture that provides a fluid path between the valve element bore and the exterior surface.

13. An electrohydraulic control valve comprising:
a valve body having a longitudinal bore there through forming a workport at one end of the longitudinal bore, and having a first port and a second port in communication with the longitudinal bore;
a valve element slideably received within the longitudinal bore and having first and second ends with a valve element bore extending into the valve element from the first end, and including an aperture that provides a fluid path between the valve element bore and selectively the first port and the second port;
a solenoid actuator having a moveable armature operatively coupled to the valve element and defining a first chamber on one side of the armature and a second chamber on an opposite side of the armature, the armature having an armature bore extending between the first chamber and the second chamber; and
a damping element received within the armature bore for controlling bidirectional fluid flow between the first chamber and the second chamber, the damping element varies flow through the armature bore in response to a difference in pressure between the first chamber and the second chamber, to digressively dampen the motion of the armature.

14. The electrohydraulic valve as recited in claim 13 wherein the armature bore remains closed as the difference in pressure increases from zero and opens in response to the difference in pressure exceeding a given level.

15. The electrohydraulic valve as recited in claim 13 wherein the damping element comprises a body with at least one passageway formed therein.

16. The electrohydraulic valve as recited in claim 13 wherein the damping element comprises a body with passageways in an exterior surface.

17. The electrohydraulic valve as recited in claim 13 wherein the damping element has a first end facing the first chamber and a first passageway extending inwardly from the first end; and has a second end facing the second chamber and a second passageway extending inwardly from the second end.

18. The electrohydraulic valve as recited in claim 13 wherein the damping element comprises a body and a spring having one end fixedly attached to the body and another end secured to a surface of the armature bore.

19. The electrohydraulic valve as recited in claim 18 wherein the spring comprises a first section affixed to the body and having a first diameter, second section contiguous with the first section and having a second diameter that is larger than the first diameter, and a third section contiguous with the second section and having a third diameter that is larger than the second diameter, wherein the third section abuts a surface of the armature bore.

20. The electrohydraulic valve as recited in claim 13 wherein the damping element has a first end facing the first chamber and a first passageway extending inwardly from the first end; and has a second end facing the second chamber and a second passageway extending inwardly from the second end.

21. The electrohydraulic valve as recited in claim 13 wherein the damping element comprises a disk secured in the armature bore and wherein the disk has a flap that bends in response to the difference in pressure.

* * * * *